United States Patent [19]

Matsuoka et al.

[11] Patent Number: 4,874,353

[45] Date of Patent: Oct. 17, 1989

[54] GROOVED PULLEY AND MANUFACTURING METHOD THEREFOR

[75] Inventors: Ken Matsuoka, Toyohashi; Masanobu Yamazaki, Kosai, both of Japan

[73] Assignee: Fuji Kiko Company, Limited, Tokyo, Japan

[21] Appl. No.: 141,226

[22] Filed: Jan. 6, 1988

Related U.S. Application Data

[63] Continuation-in-part of Ser. No. 865,462, May 21, 1986, Pat. No. 4,767,387, which is a continuation of Ser. No. 612,341, May 21, 1984, abandoned.

[30] Foreign Application Priority Data

| May 23, 1983 [JP] | Japan | 58-90403 |
| Apr. 13, 1984 [JP] | Japan | 59-74525 |
| Apr. 13, 1984 [JP] | Japan | 59-74526 |

[51] Int. Cl.$^4$ .............................................. F16H 55/32
[52] U.S. Cl. ..................................... 474/168; 474/170
[58] Field of Search ...................... 474/168, 170, 174; 29/159 R

[56] References Cited

U.S. PATENT DOCUMENTS

| 2,471,969 | 5/1949 | Meyer | 474/174 X |
| 3,977,264 | 8/1976 | Sproul | 474/170 |
| 4,551,122 | 11/1985 | Kraft et al. | 474/170 |

FOREIGN PATENT DOCUMENTS

| 508176 | 1/1955 | Italy | 474/170 |
| 0091961 | 6/1983 | Japan | 474/170 |

*Primary Examiner*—Thuy M. Bui
*Attorney, Agent, or Firm*—Foley & Lardner, Schwartz, Jeffery, Schwaab, Mack, Blumenthal & Evans

[57] ABSTRACT

A method for manufacturing a poly-V pulley includes a process for slitting and compressing the peripheral edge portion of an essentially flat blank for forming a widened and thickened flange wall. A series of relatively narrow, deep, V-shaped grooves are cold rolled. The poly-V pulley thus produced has the flange wall with poly-V grooves, from the intermediate portion of which a web extends radially inward. This structure provides good dynamic balance of rotation for the pulley and thus prolongs the life not only of the pulleys per se but also the belt to be put around the pulley. Further, the manufacturing method allows the manufacture of relatively small diameter poly-V pulleys.

7 Claims, 14 Drawing Sheets

GROOVED PULLEY AND MANUFACTURING METHOD THEREFOR

This application is a continuation-in-part of application Ser. No. 865,462, filed May 21, 1986, now U.S. Pat. No. 4,767,387 which is a continuation of application Ser. No. 612,341 filed May 21, 1984, now abandoned.

BACKGROUND OF THE INVENTION

The present invention relates generally to a poly-V pulley formed with a plurality of narrow, deep, V-shaped grooves. The invention further relates to an improved method for manufacturing a poly-V pulley.

Nolte V. Sproul U.S. Pat. No. 3,977,264 discloses a Method of Making Poly-V Pulleys and Product. The poly-V pulley is made by forming a cup-shaped blank with a generally cylindrical annular flange which terminates at its open end in an outturned radial flange. A series of wide opening, shallow, corrugation-like V-shaped grooves then is cold rolled in the cylindrical flange by outwardly and inwardly displacing portions of the flange wall to form rounded groove valleys with intervening round crests, and slightly thinning the flange wall metal in the crests and valleys while presenting appreciable groove side wall thinning. The groove walls then are axially squeezed to compress the walls to sinuous shape while maintaining constant the radial dimensions of the inner and outer rounded surface of the grooves during axial squeezing. The sinuous formed flange wall then is roller worked compressed and extruded to form sharp V-shaped outer groove crests and thickened metal in the groove valley walls.

In the disclosed poly-V pulley, the weight balance on opposite sides of the pulley is not good enough to provide good dynamic balance while rotating. Due to the inadequate dynamic balance, the radius of the flange wall may deviate or excess vibration occurring in the pulley may cause distortion during rotation. This tends to shorten the life not only of the pulley per se but also of the belt due to the uneven distribution of friction on the belt caused by the deflection or distortion of the pulley.

In the disclosed process, since the blank has to be pre-machined or pre-prepared into a cup-shape with the generally cylindrical flange by a deep-drawing process, it has been considered difficult to make a poly-V pulley with a relatively small diameter.

SUMMARY OF THE INVENTION

Therefore, it is an object of the present invention to provide a poly-V pulley having good dynamic balance for prolonging life not only of the pulley per se but also of the belt.

Another object of the invention is to provide a poly-V pulley which has a web or hub portion so arranged that the axial extent thereof lies wholly within the axial extent of a flange wall on which the poly-V grooves are to be formed.

A further object of the present invention is to provide an improved poly-V pulley manufacturing method which facilitates manufacture of relatively small diameter poly-V pulleys, such as an automotive water pump pulley and the like.

A still further object of the present invention is to provide an improved manufacturing process including slitting process for forming the widened flange wall on the peripheral edge portion of the blank.

In order to accomplish the above-mentioned and other objects, a poly-V pulley, according to the present invention, has an axial extent of a web or hub portion which lies wholly within the axial extent of the flange wall which is formed with poly-V grooves.

The flange wall is formed by widening the peripheral portion of an essentially flat disc form blank. Widening of the peripheral portion of the blank is performed by a slitting process. The widened peripheral portion to be the flange wall is formed with a series of narrow, deep, V-shaped grooves by cold rolling process.

Preferably, thickening of the blank at the flange wall portion is performed with widening of the peripheral portion of the blank.

According to the present invention, a method for manufacturing a poly-V pulley includes a process for slitting the peripheral portion of the blank for widening to form the flange wall. Poly-V grooves are formed on the flange wall by a cold rolling process after the slitting process.

The slitting process preferably includes a process for distributing the material of the blank so as to match the volumes of material at positions where ridges are formed, corresponding to the volume required to form the ridges.

In one aspect of the invention, a pulley comprises an annular flange wall on which a belt is put around, the flange wall being formed with a plurality of V-shaped grooves formed by a slitting process and a rolling process, and a web radially and inwardly extending from the flange wall.

In another aspect of the invention, a method for manufacturing a poly-V pulley comprises the steps of slitting the peripheral edge portion of an essentially flat blank for widening the peripheral edge portion so as to form a flange wall, and cold rolling a series of poly-V grooves on the flange wall.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
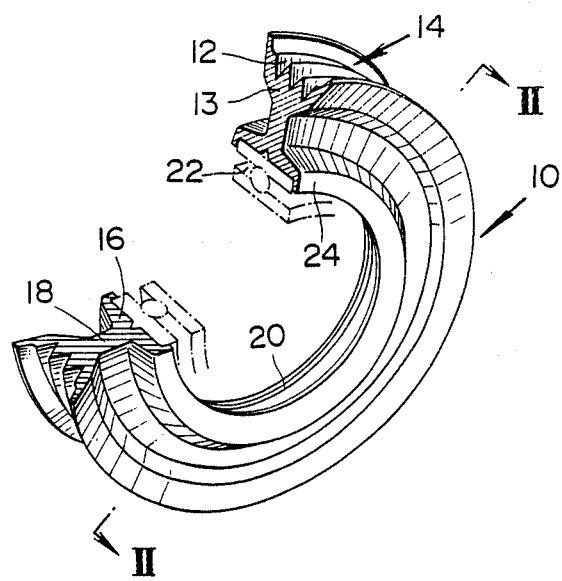
FIG. 1 is a perspective view of a poly-V pulley to be manufactured in the preferred embodiment of a manufacturing method according to the present invention.
Figure 2:
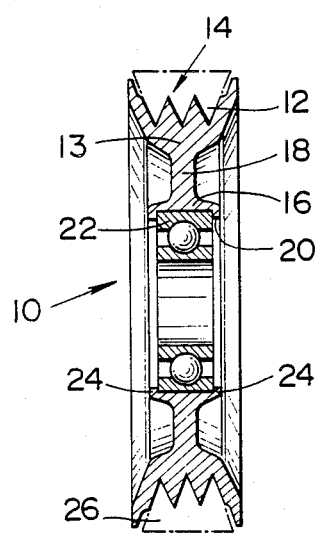
FIG. 2 is a cross-section taken along line II—II of FIG. 1.

Referring now to the drawings, particularly to FIGS. 1 and 2, the preferred embodiment of a poly-V pulley 10 according to the present invention is formed with a plurality of circumferentially extending poly-V grooves 12 of generally V-shaped cross-section in the floor of a flange wall 13 defining a belt recess 14. The flange wall 13 is connected to a generally cylindrical base 16 via a web 18. The base 16 defines an internal cylindrical space 20. A bearing 22 is attached to the inner periphery of the base 16. The axial edges 24 of the base 16 are crimped to retain the bearing 22.

Figure 3:
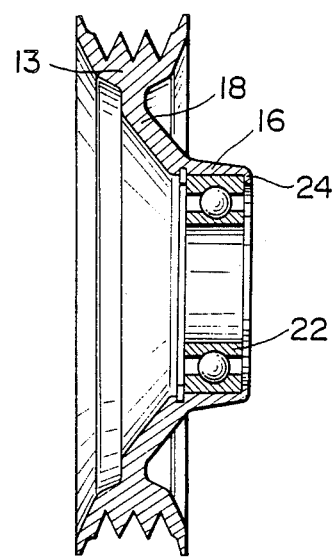
FIG. 3 is a view similar to FIG. 2 of a modified pulley which is formed into an off-set pulley.

It should be appreciated that the number of grooves to be formed in the flange wall 13 may be arbitrarily adjusted to match the shape of the belt 26 to be put around the pulley 10. Furthermore, the pulley can be formed as a kind of offset pulley with the flange wall 13 and base 16 lying in different parallel planes as shown in FIG. 3.

Figure 4:
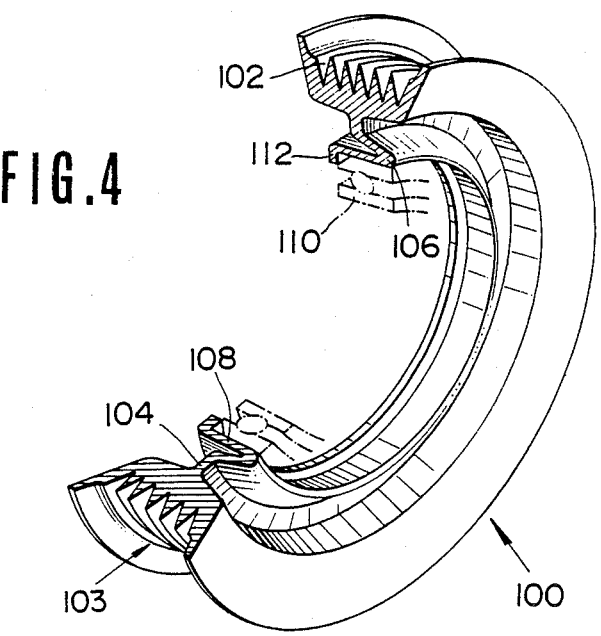
FIG. 4 is a perspective view of another modification of the pulley of FIG. 1.

FIG. 4 shows another modification of the poly-V pulley to be manufactured by the preferred embodiment of a manufacturing method according to the present invention. The modified poly-V pulley 100 is formed with a series of relatively narrow, deep, V-shaped poly-V grooves in a flange wall 103, similarly to the aforementioned pulley 10 of FIG. 1. On the other hand, a web 104 is bent along a crease 106 to form a bracket 108 for a bearing 110. One end 112 of the bracket 108 extends radially inward to form a retainer for the bearing 110.

As in the aforementioned pulley 10 of FIG. 1, the poly-V grooves 102 on the flange wall 103 are formed by a slitting process and a rolling process.

Figure 31:
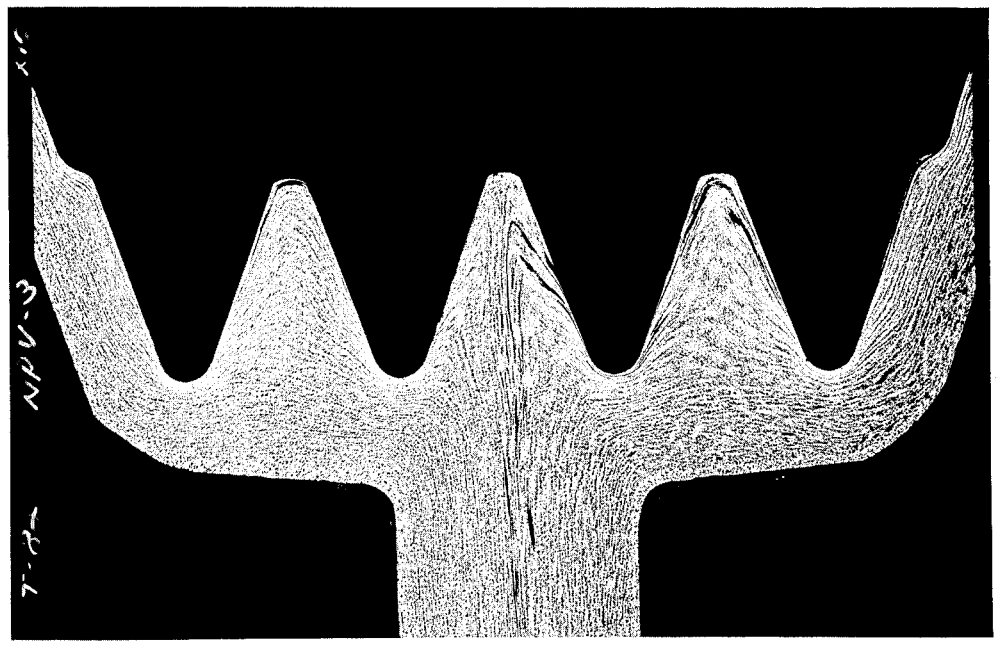
FIG. 31 is a schematic representation of the flow pattern of the metal of a poly-V pulley manufactured according to the present invention.
Figure 32:
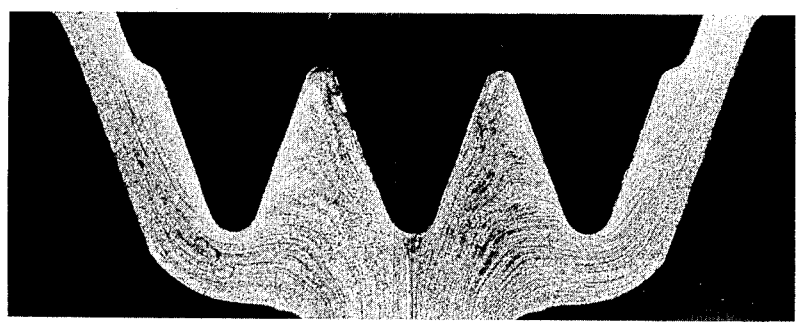
FIG. 32 is another schematic representation of the flow pattern of the metal of a poly-V pulley manufactured according to the present invention.
Figure 33:
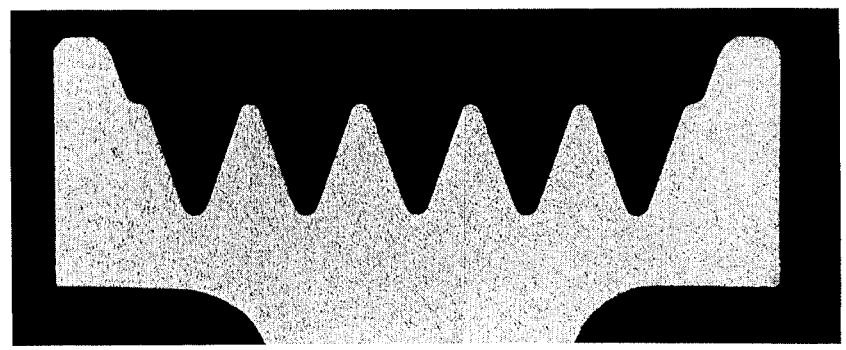
FIG. 33 is a schematic representation of the flow pattern of the metal of a poly-V pulley manufactured by a casting process.
Figure 34:
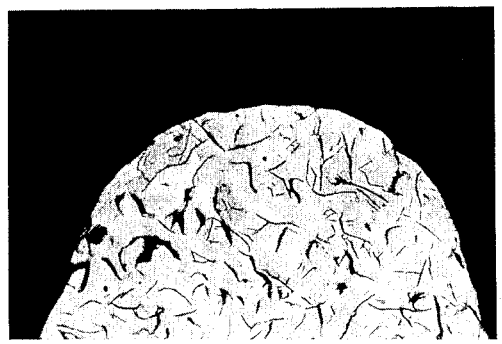
FIG. 34 is a schematic representation of a ridge of a poly-V pulley manufactured by a casting process.
Figure 35:
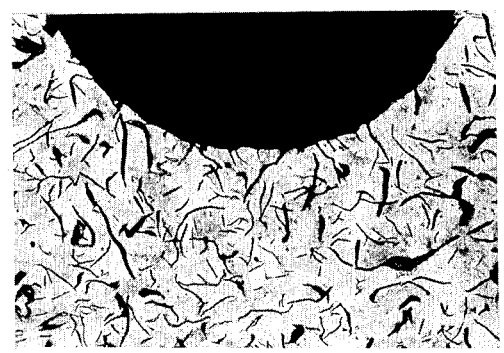
FIG. 35 is a schematic representation of a groove of a poly-V pulley manufactured by a casting process.

The slitting and rolling process for forming the poly-V grooves 12, 102 produces a poly-V pulley which offers several advantages over known poly-V pulleys. For example, the metal of a pulley constructed by the slitting and rolling process of the invention exhibits a flow pattern similar to that shown in FIGS. 31 and 32. The fiber-like metal grains flow along continous paths extending from web 104, through the central section of flange wall 103 and into a respective axially extending section of flange wall 103. In contrast, the metal of a pulley constructed by casting is similar to that shown in FIGS. 33–35. In a cast metal pulley, the metal fibers are not distributed along continuous paths. The pattern of continuous fiber paths of the rolled pulley gives the pulley greater strength than a similarly dimensioned cast pulley.

Figure 36:
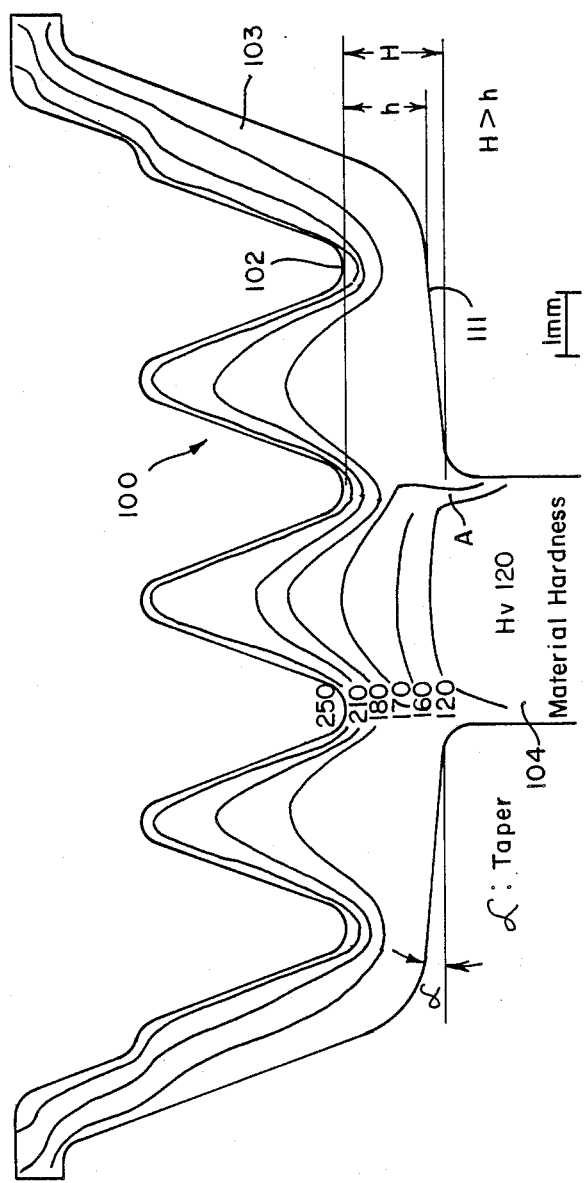
FIG. 36 is a cross-sectional view of the poly-V pulley of FIG. 31 having lines representing hardness characteristics of various portions of the pulley.
Figure 37:
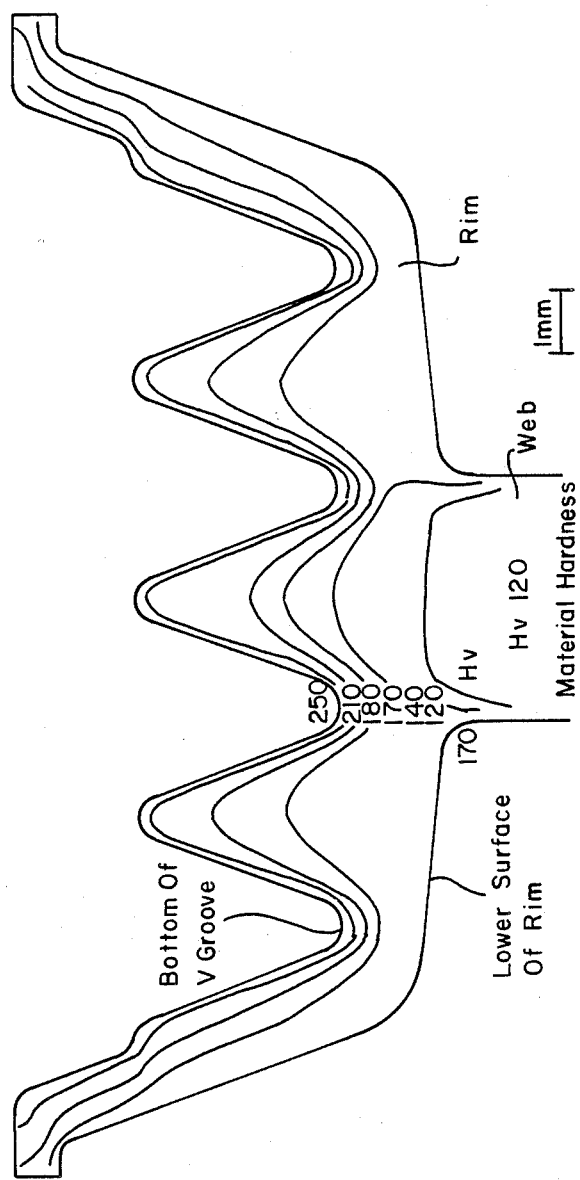
FIG. 37 is a cross-sectional view of the poly-V pulley of FIG. 31 and illustrating the increased thickness H of the flange section toward the axis of the pulley and the decreased thickness h of the flange section radially spaced from the axis of the pulley.
Figure 38:
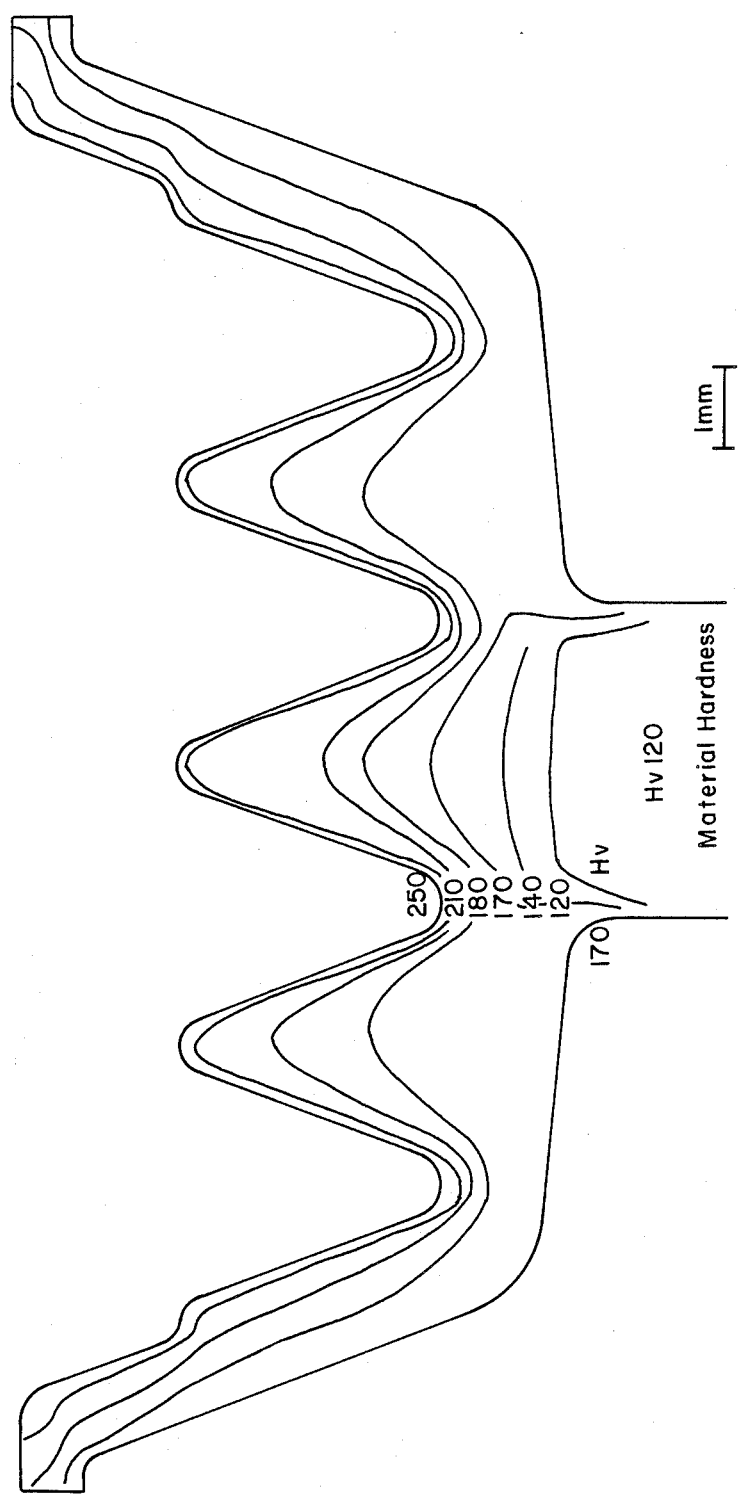
FIG. 38 is another cross-sectional view of the pulley of FIG. 31.

Additionally, the slitting and rolling process of the present invention provides the poly-V pulley 100 with a high density of fiber-like metal flow in the ridges between the grooves 102 and along the grooves 102, as shown by the hardness distribution lines in FIGS. 36–38. The high density of fiber-like metal flow in these regions is a beneficial work hardening which reinforces the surface of the pulley so as to achieve a higher wear resistance.

As shown in FIGS. 1–4, but in more detail in FIG. 37, poly-V pulley 100 is constructed such that the cross-sectional thickness h of the axially outermost portion of flange 103, which is measured from the bottom of each outermost groove on each side of web 104 to a radially inward point on inner surface 111 of flange 103, is less than the cross-sectional thickness H of the axially innermost portion of flange 103, which is measured from the bottom of each innermost groove on each side of web 104 to a radially inward point A. Point A lies at approximately the same radial distance as the junction of inner surface 111 and web 104. This difference in the thickness h and H produces a pulley having an inner surface 111 that slants radially outward at an inclination angle $\alpha$. This gradual reduction in the cross-sectional thickness of flange 103 facilitates uniform stress distribution on the pulley.

Figure 5:
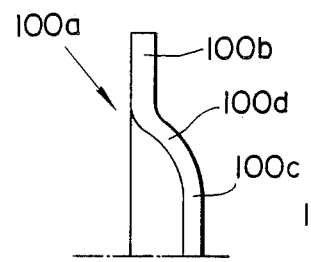
FIGS. 5 to 7 are illustrations showing preparation of a blank to be formed into the poly-V pulley of FIG. 4, by forming a base to receive a bearing.

As shown in FIG. 5, a metal blank 100a is formed.

Figure 6:
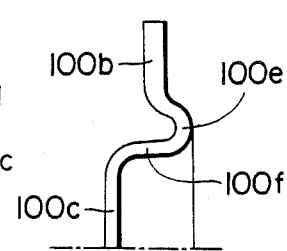
Figure 7:
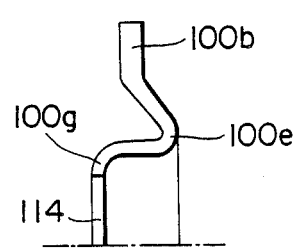

FIGS. 5 to 7 show the preparation process to form the bracket 108 and the bearing retaining end 112. As shown in FIG. 5, a metal blank 100a is, at first, formed into a circular dish-shaped workpiece at the initial stage of the preparation processes. The edge of the workpiece denoted by the reference number 100b is where the flange wall with the poly-V grooves are to be formed. A central section 100c is substantially parallel to the edge 100b and offset from the latter. The central section 100c is connected integrally with the edge 100b through a section 100d. In the next process, the section 100d is rolled back along a crease 100e, as shown in FIG. 6. In this process, the workpiece 100a is formed to have a transverse section 100f extending perpendicular to the section 100b and 100c. The section 100f is designed to house the bearing.

Finally, a circular central opening 114 is formed in the central section 100c, as shown in FIG. 7. When the opening 114 is formed, a relatively short flange 100g is allowed to remain. The flange 100g serves to retain the bearing on the section 100f.

The poly-V grooves 12 or 102 in the flange wall 13 or 103 are formed by a combination of a slitting process and a cold rolling process which will be described in detail with reference to FIGS. 8 to 11 illustrating processes necessary to form the poly-V pulley in accordance with the preferred embodiment of the poly-V pulley manufacturing method.

Figure 8:
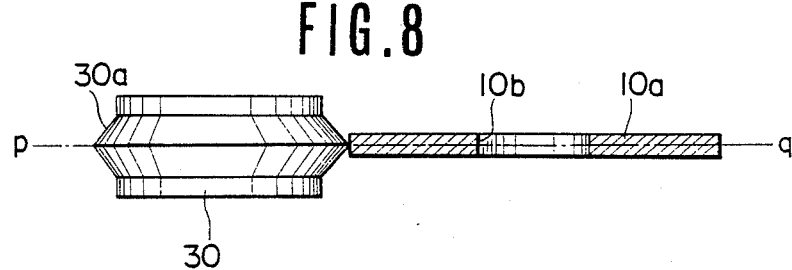
FIGS. 8 to 11 show the processes for forming the poly-V pulley of FIG. 1.

With reference to FIG. 8, a metal blank 10a is premachined into an annular disc shape before performing the slitting process which is performed in advance of the cold rolling process. When a bearing is provided in the base portion of the pulley as shown in FIG. 1, the circumferential edge portion of the central opening 10b of the metal blank or workpiece 10a may be widened so as to form the base portion receiving the bearing 22. Forming of the base portion 16 may be carried out by a per se well-known process, though the drawings do not clearly show the base forming process in a form illustrated in FIGS. 1 to 3. The base portion 16 may be formed in the form of FIG. 8 by the processes illustrated in FIGS. 5 to 7.

It should be noted that, although the poly-V pulley illustrated in FIGS. 1 and 4 is illustrated to have the base portion 16 receive the bearing in order to form an idler pulley, it is not always necessary to form the widened base portion.

The workpiece 10a is positioned so that its outer edge opposes a first roller 30 with a sharp edge 30a. The first roller 30 serves to perform the slitting processes. The plane q bisecting the workpiece is aligned with the plane P bisecting the edge 30a of the roller 30. Both the roller 30 and the workpiece 10a are driven to rotate during the first step of the manufacturing process by appropriate devices such as lathes (not shown). In addition, the workpiece 10 and the first roller 30 are adapted to move toward and away from one another. In the preferred embodiment, the roller 30 moves toward and away from the workpiece 10a during the first slitting process of the groove rolling process.

Figure 9:
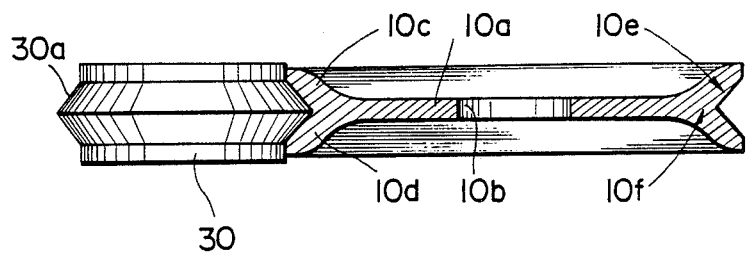

As shown in FIG. 9, the outer edge of the workpiece is divided into two sections 10c and 10d by the first roller 30. The sections 10c and 10d will have approximately the same volume. The first roller 30 also travels toward the workpiece far enough to compress the edges of the workpiece and thus thicken areas 10e and 10f. The travelling distance of the roller 30 may be so determined that the roller divides the edge of the workpiece into two sections and thickens the areas 10e and 10f to a desired thickness.

Figure 10:
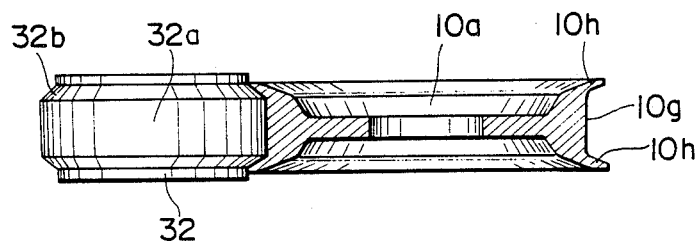

After the first step, a second process is performed by means of a flat-top second roller 32. The second roller 32 has a broad, blunt edge 32a with a tapered section 32b to either side. Similarly to the first roller, the second roller 32 is adapted to move toward and away from the workpiece 10a. As shown in FIG. 10, by means of the second roller 32, the workpiece 10a is formed with a flat-bottom recess 10g with peripheral flanges 10h.

Figure 11:
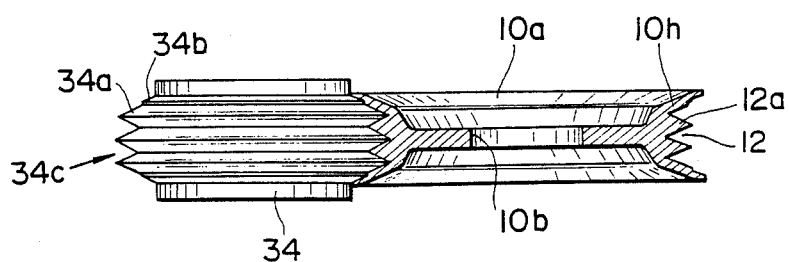

Then, the grooves 12 are formed in the floor of the recess 10g by means of a third roller 34 as shown in FIG. 11. As will be seen from FIG. 11, the third roller 34 has a plurality of sharp traingular working edges 34a. The number of working edges corresponds to the number of grooves to be formed in the floor of the flange wall. The height H of the edges corresponds to the depth D of the grooves 12.

Similarly to the aforementioned first and second rollers, the third roller 34 is able to move toward and away from the workpiece. The tapered surfaces 34b of the edges 34a generally match the tapered surfaces 32b of the second roller 32 and guide the third roller as it moves toward the workpiece. By travel of the third roller 34 toward the workpiece, the material of the floor 10i is divided into triangular-cross-section ridges 12a. As a result, the V-shaped-cross-section grooves 12 are defined by the ridges 12a and the peripheral flanges 10h.

As the third roller 34 moves toward the workpiece, it redistributes the material forming the flange wall into the groove 34c between the edges 34a to form the ridges 12a. Therefore, the stroke of the third roller will be approximately half of the desired peak-to-trough depth D of the groove. Since the material is deformed to define the grooves rather than cut or ground, no waste material will be produced.

It should be appreciated that, although the shown embodiment concerns a pulley with three grooves, the number of the grooves may be arbitrarily selected by selecting an appropriate roller for use in the third step.

Figure 12:
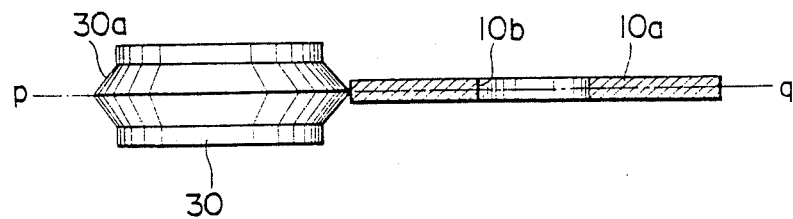
FIGS. 12 to 15 show a modified process for forming the poly-V pulley of FIG. 1.
Figure 13:
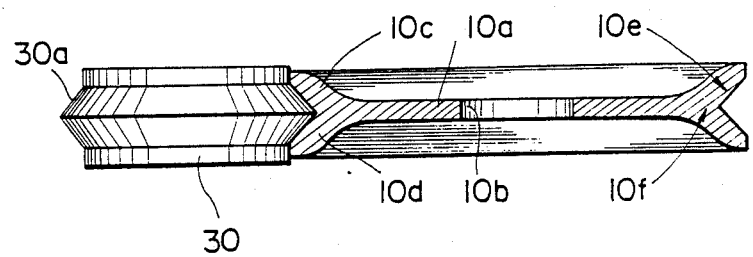
Figure 14:
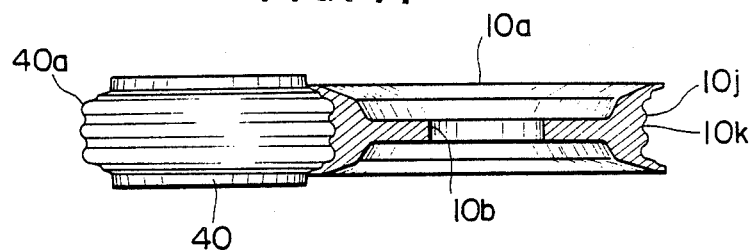
Figure 15:
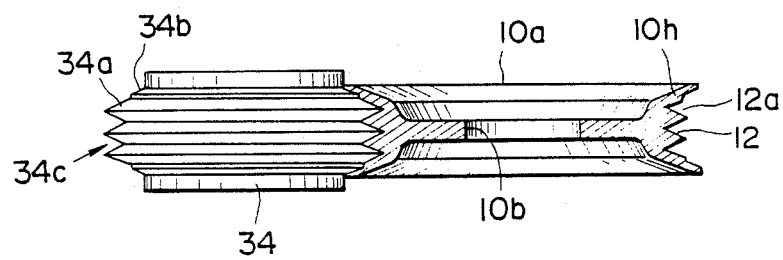

FIGS. 12 through 15 illustrate a modification to the manufacturing process of the poly-V pulley. In this modification, the second roller with the flat working edge is replaced with a roller 40 with a number of rounded working edges 40a as shown in FIG. 14. The edges 40a are designed to form rounded ridges 10j and rounded grooves 10k in the workpiece which is first machined by the first roller as shown in FIGS. 12 and 13 which are identical to FIGS. 8 and 9. Thereafter, the multi-edged roller 34 is used as in the previous method to finish forming the poly-V grooves 12, as shown in FIG. 15, which matches FIG. 11.

Figure 16:
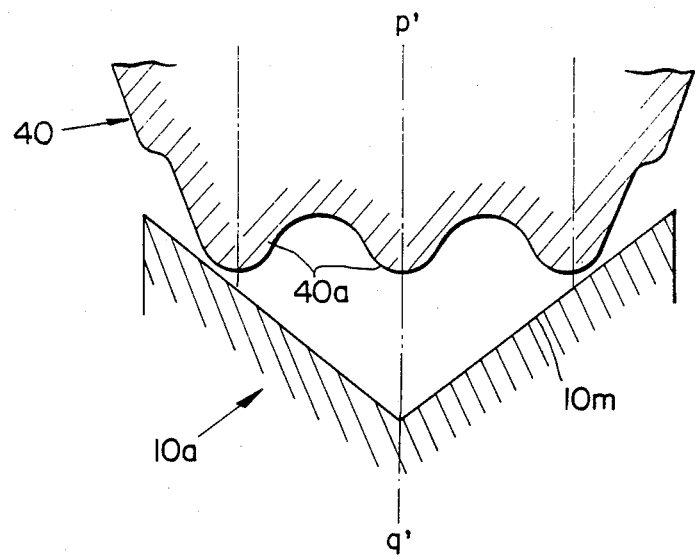
FIGS. 16 to 18 are explanatory illustrations showing the process of FIG. 14 in more detail.
Figure 17:
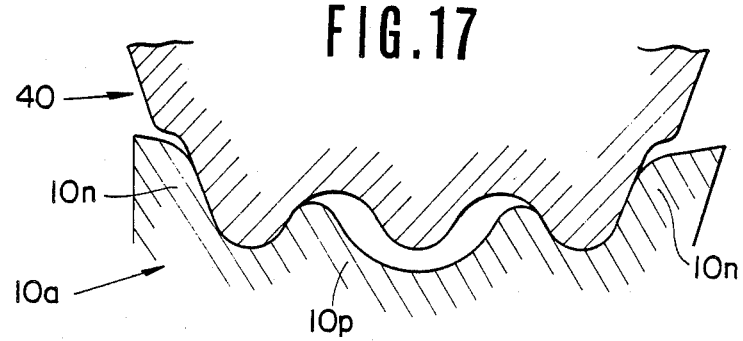
Figure 18:
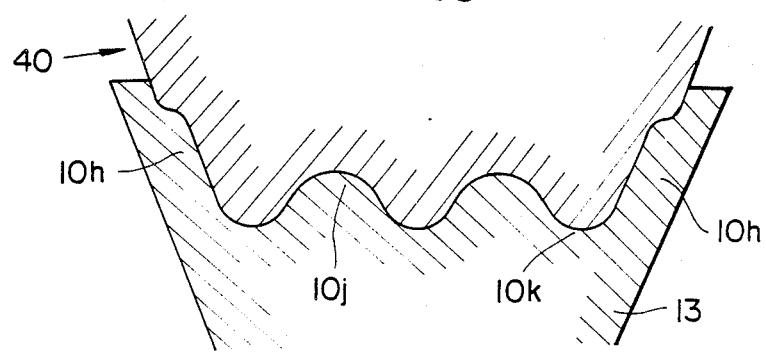

As shown in FIG. 16, at the beginning of the second process employing the second roller 40, the roller 40 is aligned so that its axis p' is coplanar with the axis q' of the workpiece 10, which has canted surfaces 10m formed in the first slitting process by means of the first roller. At first, only, the left- and right-hand edges 40a come into contact with the surfaces 10m of the workpiece. As the roller 40 is driven slowly into the workpiece, the workpiece is deformed such that some of the material of the workpiece is displaced to either side of the working edges 40a. The roller 40 reshapes the workpiece 10a solely by deformation, i.e., no cutting, grinding or removal of material is necessary. The material 10n displaced to the outside of the right- and left-hand edges 40a forms the outer flanges 10h of the flange wall 13 as shown in FIGS. 17 and 18. On the other hand, the material 10p between the outer edges 40a is worked into conformation with the roller 40 to form rounded ridges as shown in FIGS. 17 and 18.

This second process produces rounded grooves which correspond positionally and volumetrically to the poly-V grooves 12 of the finished pulley.

By the end of the predetermined stroke of the second roller the outer circumference of the workpiece is worked into a corrugated surface. As shown in FIG. 15, after this, the third roller 34 which is identical to that in the previous embodiment is applied to the workpiece to form the poly-V grooves 12. First, the planes of the working edges 34a are brought into alignment with the planes of the opposing rounded grooves 10k. As in the previous embodiment, the poly-V grooves 12 are then formed into the circumference of the pulley by means of the third roller.

According to this modification, since the material of the workpiece and especially the region of the displaced material 10p, is preprocessed into corrugations by the second roller 40, the stresses created in the final process step, especially at the peaks of the ridges 10j will be greatly reduced. As a result, crest fold or crack in the foregoing manufacturing process can be successfully avoided.

Figure 19:
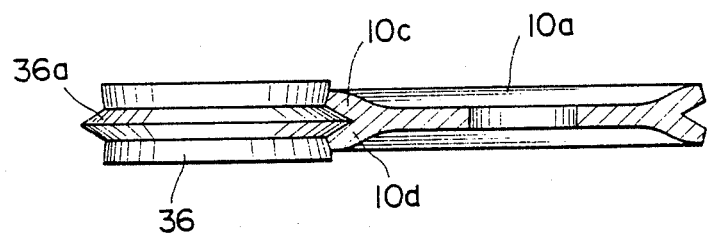
FIGS. 19 to 22 show another modification of the preferred embodiment of the manufacturing process for forming the poly-V pulley of FIG. 1.
Figure 20:
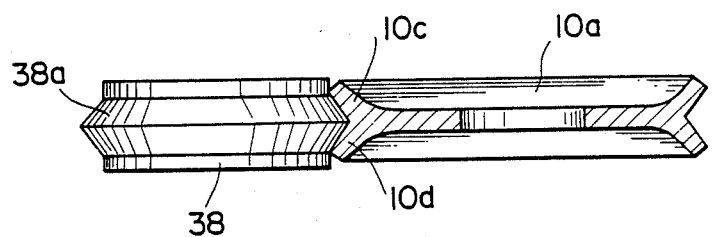
Figure 21:
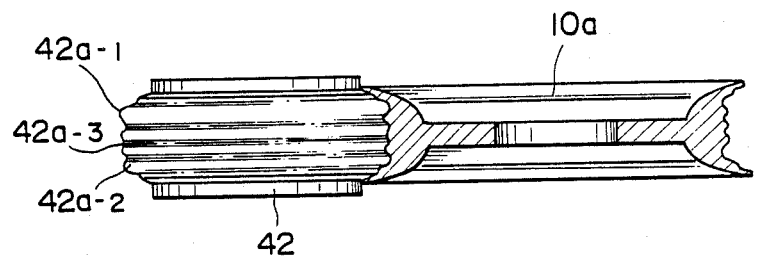
Figure 22:
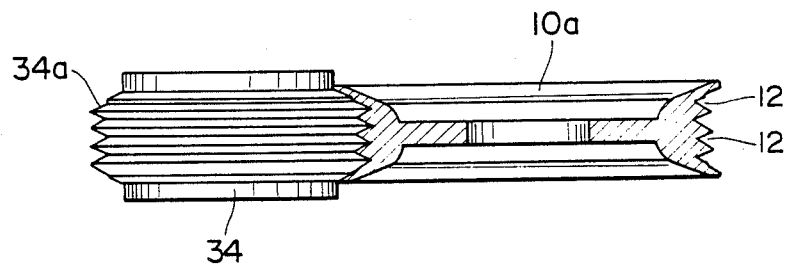
Figure 23:
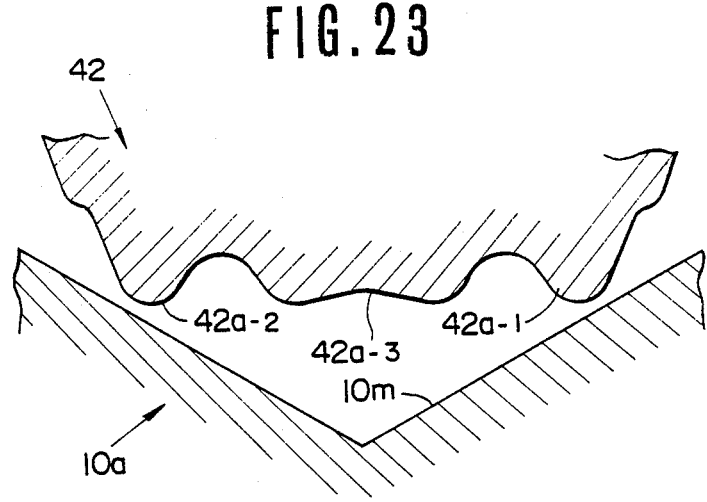
FIGS. 23 to 25 illustrate the process of FIG. 21 in more detail.
Figure 24:
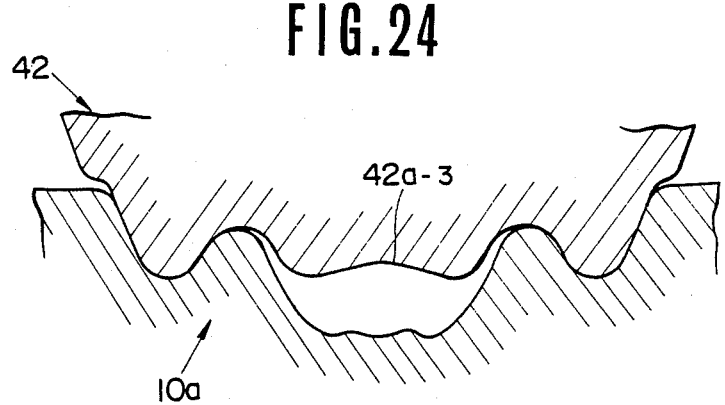
Figure 25:
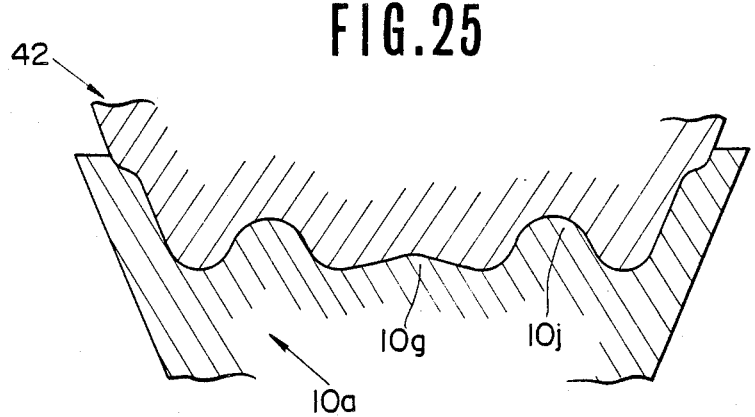

FIGS. 19 to 25 show another modification of the above-mentioned first embodiment. In this modification, the first process, in which the edge of the workpiece 10a is slitted to form a crotch wide enough to receive the second roller 42, is separated into two substeps in order to speed up the overall process. First, a starting roller 36 with a relatively acutely pointed ridge 36a is used to slit the edge of the blank 10a as shown in FIG. 19. Subsequently, a flaring roller 38 with a broader ridge 38a than the first roller 30 can be used to quickly widen the groove around the edge of the workpiece 10a as shown in FIG. 20.

In the second process of this modification, a modified second roller 42 is used in exactly the same way as in the previous modification. The second roller 42 is modified to provide four grooves in the final product and more importantly, it is modified to reduced the height of the central ridge, and so the volume of material in the central rounded ridge in the partially fabricated flange wall. Specifically, the modified second roller 42 can be viewed as having three working edges 42a, the central edge 42a-3 of which is actually the synthesis of two relatively low peaks. Thus, the center edge 42a-3 is wider and shallower than the left and right most edges 42a-1 and 42a-2. Preferably, the width of the center edge 42a-3 is approximately twice of that of the edges 42a-1 and 42a-2.

After completion of the second process, the workpiece is further machined with the third roller 34 to have the desired number of V-shaped grooves 12. This shown modification is especially adapted to form an even number of grooves which implies an odd number of ridges 10q and 10j. The third roller 34 is selected to have the same even number of edges 34a.

With the foregoing modification, a pulley with an even number of grooves can be manufactured without crest fold or crack on the central ridge.

Figure 26:
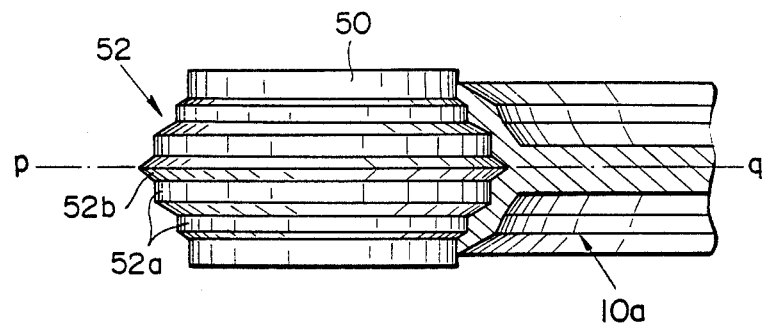
FIGS. 26 to 28 illustrate the processes of a further modification of the preferred embodiment of a manufacturing process for forming the poly-V pulley of FIG. 1.
Figure 27:
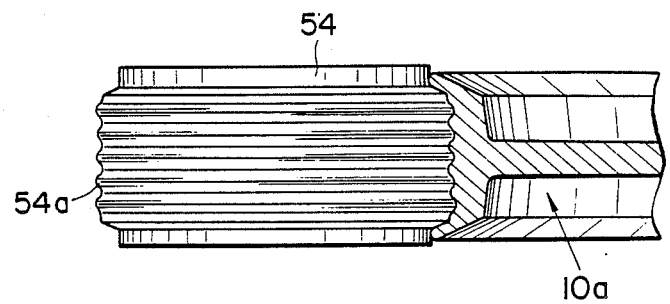
Figure 28:
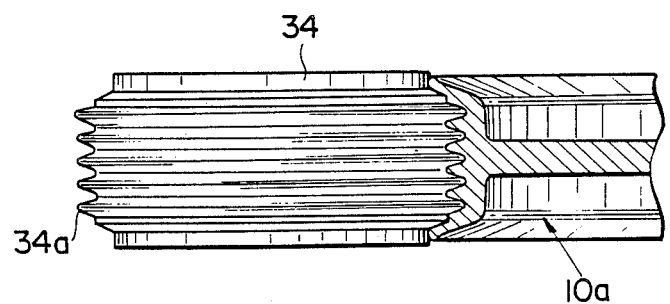

FIGS. 26 to 28 illustrate a further modification of the preferred embodiment of the poly-V pulley manufacturing method in accordance with the present invention.

The workpiece 10a is subjected to a process for forming the poly-V grooves in the flange wall on the periphery thereof. In this modification, the first roller of the aforementioned embodiments is replaced with a roller 50, as shown in FIG. 26. The roller 50 has a stepped edge 52. The stepped edge 52 is provided with a plurality of steps 52a which extend essentially parallel to the rotational axis of the pulley. The roller 50 with the stepped edge 52 is adapted to distribute material at positions coinciding with ridges between the V-shaped grooves to be formed in such a way that after completing of slitting and compressing, the volume of material delineated by the positions of the finished ridges essentially match those of corresponding regions of the finished pulley.

Figure 29:
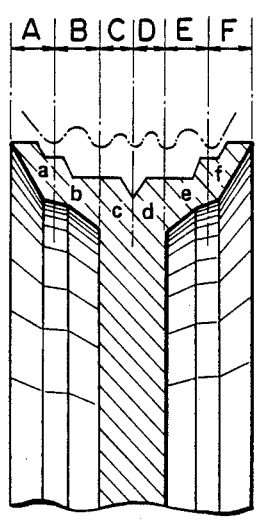
FIG. 29 is an enlarged cross-section of a workpiece as processed by the step shown in FIG. 26.

In the shown modification, the edge 52 is further provided with a sharp working edge 52b lying in the central plane q of the roller 50. Each step 52a is so arranged as to correspond to the position of a corresponding working edge 34a of the third roller 34. For instance, as shown in FIGS. 26 and 29, the positions of the steps 52a coincide with the positions at which the finished poly-V grooves will be formed. Therefore, each of the edges 34a of the roller 34 will be aligned with one of the steps in the workpiece 10a formed by means of the roller 50. However, the working edges 34a will not necessarily be centered over the corresponding steps but rather will be so aligned that the volume of material finally distributed to either side of each working edge will correspond to the volumes of the ridges and other features to be formed in the final product.

Figure 30:
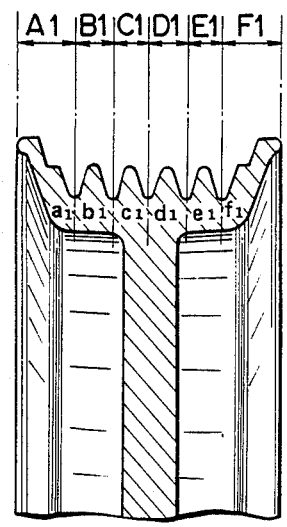
FIG. 30 is an enlarged cross-section of the grooved pulley after the step of FIG. 28.

As will be appreciated from FIGS. 29 and 30, the volumes a, b, c, d, e and f of the regions A, B, C, D, E and F of the flange wall of FIG. 29 as formed by means of the roller 50 approximate the volumes a1, b1, c1, d1, e1 and f1 of the regions A1, B1, C1, D1, E1, and F1 of the finished pulley of FIG. 30.

A roller 54 has one or more rounded working edges 54a similar to the rollers 40 and 42, as shown in FIG. 27. As described previously, the material of the workpiece 10a is redistributed by the rounded edges 54a. Then, the workpiece is worked into its final form by means of the third roller 34 with the sharp working edges 34a, the positions of which correspond to those of the rounded edges of the roller 54.

According to this second embodiment, since the material which will eventually form the features of the flange wall is preliminarily distributed by means of the roller 120, an even final distribution of the material is ensured. As a result, the depths of the grooves, or alternatively the heights of the ridges, can be matched.

Therefore, the present invention satisfactorily and successfully fulfills all of the objects sought therefor.

What is claimed is:

1. A pulley comprising:
   a substantially flat, generally annular web having an inner and an outer peripheral edge; and
   a cold rolled annular flange integrally formed on the outer peripheral edge of the web, the flange having a central section axially aligned with the web and two axially extending sections, each axially extending section extending axially beyond the web in a respective axial direction, the flange having a plurality of grooves, and the web and the flange comprising metal having continuous fiber-like metal grains extending from the web, through the center section of the flange and into a respective axially extending section of the flange.

2. A pulley as claimed in claim 1 further comprising a bearing rest integrally formed on the inner peripheral edge of the web, the bearing rest having an axially extending first section for seating a bearing and a second section extending radially inwardly from the first section for limiting axial displacement of the bearing.

3. A pulley comprising:
   a substantially flat, generally annular web having an inner and an outer peripheral edge; and
   a cold rolled annular flange integrally formed on the outer peripheral edge of the web, the flange having a central section axially aligned with the web and two axially extending sections, each axially extending section extending axially beyond the web in a respective axial direction, the flange having a plurality of grooves and the web and the flange comprising metal having continuous fiber-like metal grains extending from the web, through the center section of the flange and into a respective axially extending section of the flange, the portions of the flange defining the plurality of grooves comprising a higher density of metal than other portions of the flange.

4. A pulley as claimed in claim 1 wherein the radially inward surface of each axially extending section of the flange is flared radially outwardly from the web toward the axial outer end of the respective axially extending section and the radial thickness of the respective axially extending section as measured between the bottom of the axially outermost groove in the section and the radially inward surface is less than the radial thickness measured between the bottom of a groove overlying the web and a location on the web approximately the same radial distance as the junction of the web and the flange.

5. A pulley as claimed in claim 1 wherein the flange comprises three grooves.

6. A pulley as claimed in claim 5 wherein the three grooves are separated from one another by a pair of peaks of substantially the same radial height.

7. A pulley comprising:
a substantially flat, generally annular web having an inner and an outer peripheral edge; and
a cold rolled annular flange integrally formed on the outer peripheral edge of the web, the flange having a central section axially aligned with the web and two axially extending sections, each axially extending section extending axially beyond the web in a respective axial direction, the flange having a plurality of grooves and the web and the flange comprising metal flowed in continuous fiber-like metal grains from the web, through the central section of the flange and into a respective axially extending selection of the flange;
wherein the pulley is prepared by a process comprising the steps of:
slitting an outer peripheral edge of a substantially flat metal blank so as to divide the metal blank into two sections interconnected along their radially inward portions by a web;
radially thickening each section of the metal blank;
axially widening each section of the metal blank;
forming a generally flat, peripheral recess surface along the interconnection of the two sections; and
cold rolling a plurality of grooves in the peripheral recess surface.

* * * * *